United States Patent
Reisner et al.

(10) Patent No.: US 8,769,564 B2
(45) Date of Patent: Jul. 1, 2014

(54) CROSS-PLATFORM ADVERTISEMENT SYNCHRONIZATION

(75) Inventors: Samuel J. Reisner, Burbank, CA (US); Robert Lee Hunter, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 13/426,987

(22) Filed: Mar. 22, 2012

(65) Prior Publication Data
US 2013/0254797 A1 Sep. 26, 2013

(51) Int. Cl.
*H04N 7/025* (2006.01)

(52) U.S. Cl.
USPC .................... 725/32; 725/36; 725/48; 725/51

(58) Field of Classification Search
USPC .......................... 725/32, 36, 48, 51
See application file for complete search history.

(56) References Cited

U.S. PATENT DOCUMENTS

| | | | | |
|---|---|---|---|---|
| 5,805,974 A | * | 9/1998 | Hite et al. | 725/69 |
| 7,653,923 B2 | * | 1/2010 | Flickinger | 725/36 |
| 2002/0133405 A1 | * | 9/2002 | Newnam et al. | 705/14 |
| 2010/0257553 A1 | * | 10/2010 | Yuen et al. | 725/36 |
| 2012/0240151 A1 | * | 9/2012 | Tapper | 725/32 |

* cited by examiner

*Primary Examiner* — Pankaj Kumar
*Assistant Examiner* — Timothy Newlin
(74) *Attorney, Agent, or Firm* — Buckley, Maschoff & Talwalkar LLC

(57) ABSTRACT

In some example embodiments, a television transmission that a user is viewing at a given time is determined and a website that the user is viewing at the given time is also determined. A first advertisement transmitted at the given time on the television transmission is further determined and a second advertisement transmitted on the website is synchronized with the first advertisement transmitted at the given time on the television transmission.

18 Claims, 4 Drawing Sheets

CROSS-PLATFORM ADVERTISEMENT SYNCHRONIZATION

FIELD

The present invention relates to synchronized advertisements. In particular, the present invention relates to systems and methods for synchronizing advertisements across multiple media platforms with which a user may be simultaneously engaged.

BACKGROUND

Advertising is a form of communication used to encourage or persuade an audience of viewers, readers or listeners to continue or take some new action. Most commonly, the desired result is to drive consumer behavior with respect to a commercial offering, although political and ideological advertising is also common. Advertising messages are usually paid for by sponsors and presented via various media platform types including newspaper, magazines, television, radio, outdoor advertising, direct mail, websites, telephone, and text messages.

As consumers engage with a growing number of media platforms, sponsors are increasingly seeking ways to present their advertisements to consumers in a cohesive fashion. However, present efforts to advertise across multiple media platforms have been somewhat haphazard as each media platform is generally operated independently. For example, even though a single company may own and operate both a television network and a radio station, the advertisements presented on the television network and the radio station are generally independent of one another. Thus, although opportunities exist for a single sponsor to present advertising messages on multiple media platforms, efforts to coordinate the content and timing of advertising messages across multiple media platforms have proven difficult.

It would be desirable to provide systems and methods that would allow for synchronizing advertisements across multiple media platforms with which a user may be simultaneously engaged.

DETAILED DESCRIPTION

To alleviate problems inherent in the prior art, the present invention introduces systems and methods wherein advertisements are synchronized across multiple media platforms with which a user may be simultaneously engaged.

Some embodiments of the present invention are associated with a "user" who is at a given time engaged with multiple media platforms. As used herein, the term "user" might refer to, for example, a person who is capable of engaging with multiple media platforms simultaneously and who is part of a target audience for an advertisement of a sponsor of the multiple media platforms. As used herein, the term "demographic information" about a user might refer to, for example, any characteristic of the user that may be useful in adapting an advertisement to make the advertisement more appealing and relevant to the user. Such characteristics may include, but are not limited to, a user's gender, race, age, disabilities, mobility, home ownership status, employment status, and physical location. These, and other, terms will be used to describe features of some embodiments of the present invention by reference to the following detailed description of the invention, the appended claims and the drawings provided herewith.

For purposes of illustrating features of some embodiments of the present invention, a simple illustrative example will now be introduced and referenced throughout the disclosure. In the illustrative example, a user (named "Alex Doe") is simultaneously watching a television and browsing a web browser. In particular, Alex Doe is viewing a live NBA basketball game between the Los Angeles Laker and the Chicago Bulls on the television network transmission from ESPN on his television and simultaneously browsing the ESPN Fantasy Basketball website at games.espn.go.com/frontpage/basketball on his web browser. Both the ESPN television network as well as the ESPN Fantasy Basketball website include advertisements. Those skilled in the art will recognize that this example is illustrative and not limiting and is provided purely for explanatory purposes.

Figure 1:
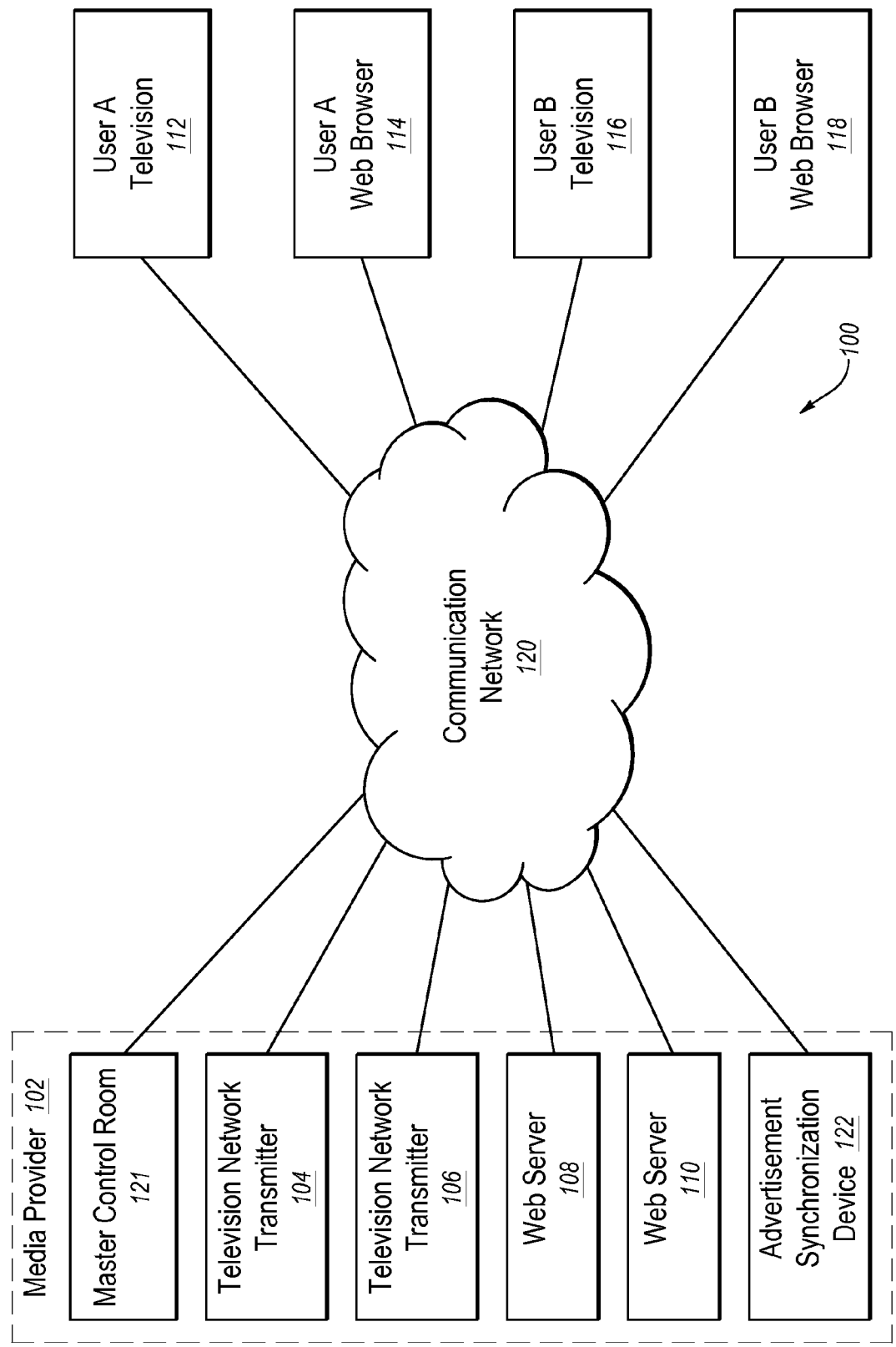
FIG. 1 is a block diagram representation of a system that may be provided according to some embodiments.

Turning now in detail to the drawings, FIG. 1 is a block diagram representation of a system 100 that may be provided according to some embodiments. The system 100 includes a media provider 102 that provides contents to users through the operation of first and second television network transmitters 104 and 106 and first and second web servers 108 and 110. For example, a user A may access the content provided by the media provider 102 using a television 112 and a web browser 114. Similarly, a user B may access the content provided by the media provider 102 using a separate television 116 and a separate web browser 118.

The media provider 102 may provide program content to users A and B via television network transmissions and websites. In addition to the program content provided by the media provider 102, the media provider 102 may additionally provide advertisements to users A and B via its television network transmissions and websites. Third-party financial sponsorship of the advertisements may help the media provider 102 defer the costs associated with producing and delivering the program content to end users. Alternatively, the advertisements may be provided to advertise the program content provided by the media provider 102 or to advertise public service content, in both cases without direct financial compensation to the media provider 102. Embodiments of the present invention allow the media provider 102 to synchronize the advertisements across multiple media platforms. For example, embodiments of the present invention allow the media provider 102 to synchronize the advertisements provided over the television transmissions and websites that are transmitted by the television network transmitters 104 and 106 and the web servers 108 and 110.

The system 100 also includes a communication network 120. The television network transmitters 104 and 106, the web servers 108 and 110, the televisions 112 and 116, and the web browsers 114 and 118 may communicate via the communication network 120. The communication network 120 may include, for example, a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a broadcast television network, a cable television network, an Internet Protocol (IP)

network such as the Internet, or some combination thereof. Moreover, as used herein, network communications include those enabled by wired or wireless technology. Although a single communication network 120 is shown in FIG. 1, any number of such networks may be included in the system 100. Similarly, any number of the other devices described herein may be included in the system 100 according to embodiments of the present invention.

The television network transmitters 104 and 106 and the web servers 108 and 110 of the media provider may communicate with, for example, the televisions 112 and 116 and web browsers 114 and 118. For example, the television network transmitters 104 and 106 may communicate with the televisions 112 and 116 via broadcast or cable television networks or IP network(s) included in the communication network 120. The television network transmitters 104 and 106 may interface with a master control room (MCR) that determines when the advertising breaks occur in the program content transmitted by the television network transmitters 104 and 106. Similarly, the web servers 108 and 110 may communicate with the web browsers 114 and 118 via IP network(s) included in the communication network 120, for example. The televisions 112 and 116 may be any device capable of performing the various functions described herein. The web browsers 114 and 118 may be embodied as software on a computing device such as a web-enabled personal computer (PC), laptop computer, hand-held computer, tablet computer, mobile device, internet enabled television, or other computing device. Although the embodiments disclosed in the drawings are illustrated with respect to television transmissions and websites as the illustrated media platforms, it is understood that other media platform types could be employed including, but not limited to, radio transmissions, text messages, emails, or telephonic communications.

In the illustrative example introduced above, the system 100 may be employed by Alex Doe to watch the ESPN television transmission that is transmitted from the television network transmitter 104 using his television 112. Simultaneously, Alex Doe may browse the ESPN Fantasy Basketball website transmitted by the web server 108 using his web browser 114. In addition to the program content provided by the television transmission and the website, the television transmission and the website also provide advertisements. Embodiments of the present invention allow the media provider 102 to synchronize the advertisements provided on these television transmissions and websites using an advertisement synchronization device 122.

Figure 2:
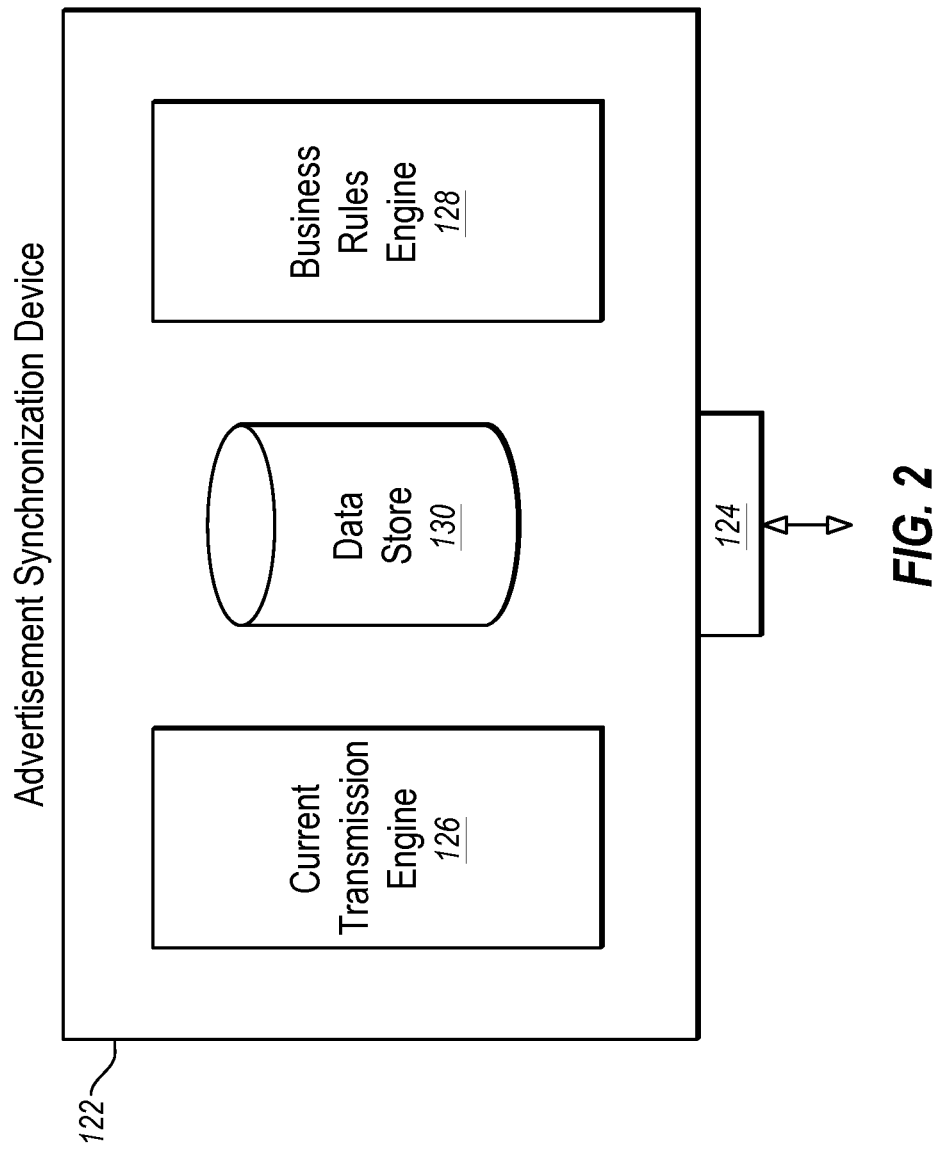
FIG. 2 is a block diagram of an advertising synchronization device according to some embodiments.

FIG. 2 is a block diagram of the example advertisement synchronization device 122 that was described above with respect to FIG. 1, according to some embodiments. In this case, the advertisement synchronization device 122 includes a communication port 124 to exchange data over a network to facilitate communication with, for example, other devices (such as the television network transmitters 104 and 106, the web servers 108 and 110, the televisions 112 and 116, and the web browser 114 and 118). Note that numerous ports 124 may be provided (to allow for simultaneous communication with a number of other devices) and may be preferably configured with hardware suitable to physically interface with desired external devices or network connections. For example, the communication port 124 may comprise an Ethernet connection to a local area network through which the advertisement synchronization device 122 may receive and transmit information over the Internet and over private or proprietary networks.

In addition, the advertisement synchronization device 122 includes a current transmission engine 126 and a business rules engine 128 that each may include one or more processors. The engines 126 and 128 operate to execute processor-executable process steps so as to control the advertisement synchronization device 122 to provide desired functionality. The advertisement synchronization device 122 further includes a data store 130 that is in communication with the engines 126 and 128.

The data store 130 may comprise any appropriate information storage device, including combinations of magnetic storage devices (e.g., magnetic tape and hard disk drives), optical storage devices, or semiconductor memory devices such as Random Access Memory (RAM) devices and Read Only Memory (ROM) devices, for example. The data store 130 may store programs for controlling the processors of the engines 126 and 128. The programs may be stored in a compressed, uncompressed, compiled, uncompiled, encrypted, or unencrypted format, or some combination thereof. The programs may furthermore include other program elements, such as an operating system, a database management system, and device drivers used by the processors of the engines 126 and 128 to interface with peripheral devices. The processors of the engines 126 and 128 perform instructions of the programs stored in the data store 130, and thereby operate in accordance with the present invention. The data store 130 may also store program content, advertisements, demographic information, the transmissions the transmitters 104 and 106 and the web servers 108 and 110, and business rules that enable the business rules engine 128 to dictate the selection of advertisements. The business rules engine 128 can select advertisements based on program content, advertisements, demographic information, or other relevant information, or some combination thereof. Further, the data store 130 may also store weighting information that enables the current transmission engine 126 to prioritize between available program content in determining which program content to transmit at any given time. Note that one or more of the engines 126 and 128 and storage device 130 may be co-located with, or remote from, the advertisement synchronization device 122 and the media provider 102. For example, the storage device 130 may be located remote from both the advertisement synchronization device 122 and the media provider 102 and may be accessed by the engines 126 and 128 over a network, such as the communication network 120.

Figure 3:
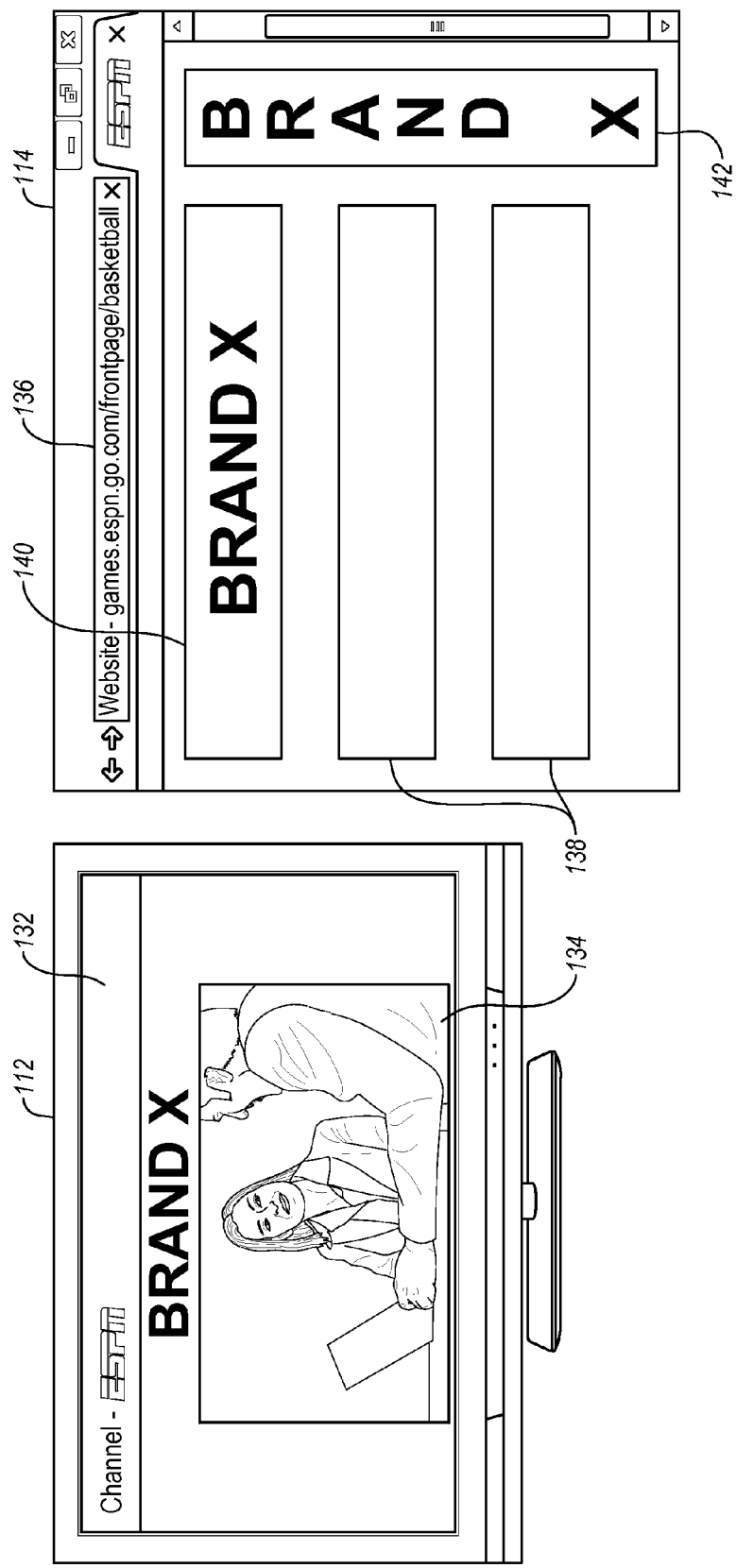
FIG. 3 is a pair of illustrative media platforms that may be used according to some embodiments.

Examples of cross-platform synchronized advertisements that can be accomplished by the advertisement synchronization device 122 are shown in FIG. 3. For example, FIG. 3 shows an example embodiment of the television 112 and the web browser 114 of Alex Doe. As shown in FIG. 3, Alex Doe has tuned his channel selector 132 of his television 112 to a television transmission of ESPN and the television transmission is in an advertising break in a live NBA basketball game between the Los Angeles Lakers and the Chicago Bulls. As such, an advertisement 134 for Brand X is presented on the ESPN television transmission. Simultaneously, Alex Doe has directed the URL indicator 136 of his web browser 114 to the ESPN Fantasy Basketball website at games.espn.go.com/frontpage/basketball, which presents both program content 138 and advertisement banners 140 and 142 for Brand X. Thus, the advertisements presented to Alex Doe on his television 112 and his web browser 114 are synchronized, in manner discussed in greater detail below.

Figure 4:
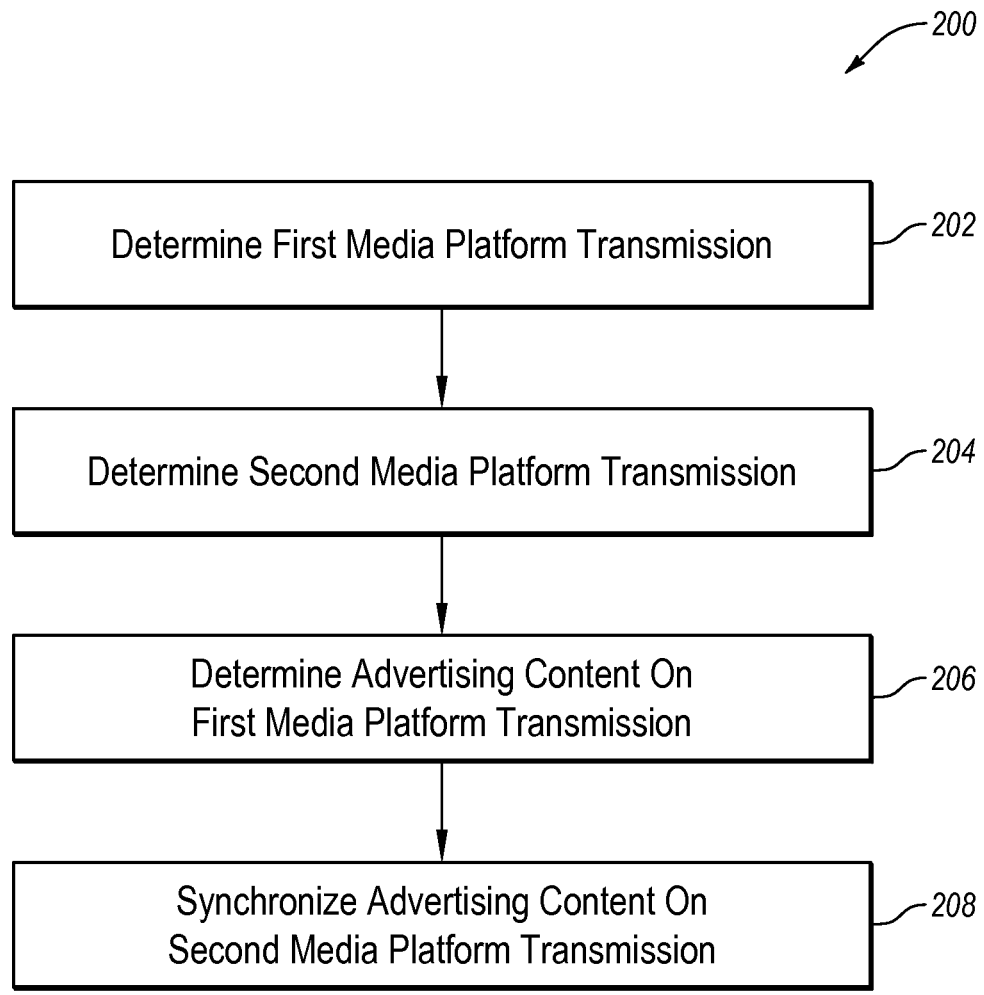
FIG. 4 is a flow chart that illustrates a method that may be performed according to some embodiments.

The advertisement synchronization device 122 of FIG. 2 and the television 112 and web browser 114 of FIG. 3 may operate in accordance with any of the embodiments described herein. By way of example only, FIG. 4 is a flow chart that illustrates a method 200 that may be performed according to some embodiments. The flow charts in FIG. 4 and the other figures described herein do not imply a fixed order to the steps, and embodiments of the present invention can be practiced in any order that is practicable. Moreover, the methods may be performed by any of the devices described herein. The method shown in FIG. 4 may be performed, for example, by the advertisement synchronization device 122 of FIG. 1 and FIG. 2. Note that the elements of FIG. 4 may be performed by different devices. For example, each element might be performed by a different device (e.g., by an advertisement synchronization device, by a television network transmitter, by a web server, or any other device). Moreover, any single element might be performed by multiple parties.

The advertisement synchronization method 200 of FIG. 4 may begin at 202, where the advertisement synchronization device 122 determines that a user is engaged at a given time with a transmission of a first media platform. Referring again to the illustrative example introduced above, processing at 202 occurs once Alex Doe tunes his channel selector 132 of his television 112 to a television transmission of ESPN, which is being transmitted by the television network transmitter 104. This engagement with the ESPN television transmission may be determined, for example, by the current transmission engine 126 of the advertisement synchronization device 122 receiving feedback from the television 112 or a device in communication with the television 112, such as a set-top box, or using digital watermarking. In one example, this feedback may be transmitted via an API over an IP network of the communication network 120, for example.

At 204, the advertisement synchronization device 122 determines that a user is engaged at the given time with a transmission of a second media platform. Referring to the illustrative example, processing at 204 occurs once Alex Doe directs the URL indicator 136 of his web browser 114 to the ESPN Fantasy Basketball website at games.espn.go.com/frontpage/basketball, which is being transmitted by the web-server 108. This engagement with the ESPN Fantasy Basketball website may be determined, for example, by the current transmission engine 126 of the advertisement synchronization device 122 receiving feedback from the web browser 114 or a device in communication with the web browser 114. For example, a pairing process may be used to link Alex does to the web browser 114, either through credentials/login, presentation of a unique television display identifier and entry into the web browser 114, geographic location information, or some other method.

At 206, the advertisement synchronization device 122 determines what advertisement is transmitted at the given time on the transmission of the first media platform. Referring to the illustrative example, processing at 206 occurs as the current transmission engine 126 of the advertisement synchronization device 122 receives feedback from the television network transmitter 104, which is at the given time transmitting the ESPN television transmission, indicating the advertisements that are on-air at the given time.

It is noted that with certain categories of television program content, such as television program content that includes a live sporting event or other type of live program content, the timing of advertising breaks on the television transmissions, and the advertisements presented on-air during those breaks, cannot be substantially predetermined. This is due to frequently changing timing of content on the television transmission of a live event. Further, the timing of breaks in a live sporting event or other live event may be determined in real time depending on the particular circumstances of the live event. Thus, in the illustrative example of the television transmission of a live NBA basketball game, a player or coach may call a timeout without any advance notice to the media provider 102 that is televising the game. Since advertising breaks are generally taken by the media provider 102 during timeouts that are called at times outside the control of the media provider and without advance notice, and as such the timing of advertising breaks on the television transmission is content dependent, the timing of advertising breaks cannot be substantially predetermined in such circumstances. Therefore, in the illustrative example, processing at 206 may occur by the current transmission engine 126 of the advertisement synchronization device 122 frequently polling the television network transmitter 104, such as every ten to thirty seconds for example, to determine in real time, or near real time, what advertisements the television network transmitter 104 is transmitting or about to transmit during advertising breaks in the NBA basketball game. The advertisements that are about to transmit may be based on a list of scheduled advertisements in a playlist for advertisements and program content within the master control room 121.

At 208, the advertisement synchronization device 122 synchronizes the advertisements transmitted on the second media platform with the advertisements transmitted at the given time on the first media platform. Referring to the illustrative example, processing at 208 may occur by the business rules engine 128 of the advertisement synchronization device 122 determining how best to synchronize the advertisements on the ESPN Fantasy Basketball website with the advertisements on the ESPN television transmission.

The business rules engine 128 may accomplish the processing at 208 by combining information on the advertisement presented at the given time on the ESPN television transmission with demographic information about Alex Doe, and then factoring the demographic information into the selection of the synchronized advertisement transmitted on the website. For example, the business rules engine 128 may gather information regarding Alex Doe from cookies or login information managed or gathered at the web browser 114. In addition or alternatively, the business rules engine 128 may gather information regarding Alex Doe from other sources. Demographic information in these examples may include profile registration information, user geographic information, and usage history, for example. Then, when the business rules engine 128 is determining how best to synchronize the advertisements on the ESPN Fantasy Basketball website with the advertisements on the ESPN television transmission, the business rules engine 128 may choose from available advertisements or create custom advertisements to personalize the advertisement to individual characteristics of Alex Doe. This synchronization may be based on logic that seeks to optimize one or more variables such as price per item or relevancy, for example.

For example, as Alex Doe is watching an NBA basketball game between the Los Angeles Lakers and the Chicago Bulls, and assuming the BRAND X product is a particular toothpaste, the data store 130 may contain two categories of website banner advertisements for the toothpaste, one showing the toothpaste being endorsed by a Lakers player and the other showing the toothpaste being endorsed by a Bulls player. The data store 130 may further contain a business rule that dictates that a user should be presented with the website banner advertisement corresponding to the team to which the user is physically closer in proximity. In the event that the business rules engine 128 is able to determine from the IP address used by the web browser 114 that Alex Doe is located in Los Angeles, the business rules engine 128 can then apply this business rule in the synchronization process to present the Lakers player endorsement website banner advertisement as the banners 142 and 144 in the personalized version of the ESPN Fantasy Basketball website presented at the given time to Alex Doe on his web browser 114. This is but one example of how a user's particular demographic information can be factored into the synchronization process in the selection or customization of advertisements transmitted on the second media platform.

It is noted that although some content presented on the ESPN Fantasy Basketball website will likely be constant across users, various aspects of the ESPN Fantasy Basketball website will be personalized for each individual user based on the user's interaction with the website and other factors. Thus, while the web server 104 may simultaneously transmit the ESPN Fantasy Basketball website to multiple users, some embodiments allow the personalized versions of the ESPN Fantasy Basketball website, including personalized advertisements, to be transmitted to each individual user.

In this manner, embodiments allow a user to be presented in real-time with synchronized advertisements on multiple media platforms, even where advance scheduling of advertising breaks is not possible. In the illustrative example, while Alex Doe is checking on his fantasy basketball team on the ESPN Fantasy Basketball website during an advertising break of an NBA basketball game on the ESPN television transmission, the advertisements that are presented to Alex Doe on the ESPN Fantasy Basketball website are synchronized with the advertisement presented on the ESPN television transmission. In some embodiments, this allows a user to simultaneously engage with advertisements on multiple media platforms. This also allows a sponsor of an advertisement to cohesively and consistently present the advertisement to a user even as a user's focus shifts back and forth between multiple media platforms.

Although embodiments have been described in connection with synchronized advertisements between a television transmission and a website, other embodiments may include synchronizing advertisements between a variety of media platform types including, but not limited to, television transmissions, websites, radio transmissions, text messages, emails, and telephonic communications. Further, although embodiments have been described in connection with synchronized advertising between two media platforms, other embodiments may include synchronizing advertisements between three or more media platforms.

For example, beyond synchronizing the advertisements between a television transmission and a website as in the illustrative example discussed above, the advertisement synchronization device 122 may further send the user a text message, an email, a telephonic communication, or some combination thereof, with additional synchronized advertisements. Also, direct forms of contacting the user, such as using a text message, an email, a telephonic communication, or a printed mailing, may also be employed as a follow-up to the user after the user has ceased to engage with the television transmission or the website or both.

Also, although embodiments have been described in connection with synchronizing advertisements of a website with the advertisements of a television transmission, other embodiments may include the reverse situation, namely, synchronizing advertisements of a television transmission with the advertisements of a website. For example, where a television network transmitter is capable of transmitting on-demand or other individualized television transmissions, such as television transmission over the Internet, the advertisements of an individualized television transmission with which a user is engaged can be modified so as to synchronize the advertisements of the individualized television transmission with the advertisements of a website with which the user is also and simultaneously engaged.

Further, although embodiments have been described in connection with synchronizing advertisements of a first media platform with the advertisements of a second media platform where it is determined that a particular user is simultaneously engaged with both the first and second media platforms, other embodiments may include synchronizing advertisements of first and second media platform where it is only determined that a particular user is engaged with one of the first or the second media platforms. For example, where it is determined only that a particular user is engaged with a particular website, embodiments may include assuming or determining that there is a high probability that a user is also engaged with a particular television transmission and synchronizing the advertisements of the website with the advertisements of the television transmission. The assumption that the user is also engaged with the particular television transmission may be based on a variety of factors including, but not limited to a correlation between the content at a given time of the website and the television transmission, the user's past television viewing behavior, the ratings of the television transmission, the user's demographics, or some combination thereof.

Also, other embodiments may include synchronizing advertisements of first and second media platforms where it is has not definitively been determined that a particular user is engaged with either of the first or second media platforms. This synchronization may be based on a tiered and weighted hierarchy. For example, where a single website is affiliated with multiple television transmissions, and it cannot be determined which television transmission or website a user may be visiting, the advertisements on the website may be synchronized with the highest weighted television transmission that is in an advertising break.

Further, although embodiments have been described in connection with synchronizing advertisements of first and second media platforms where both media platforms are owned or controlled by the same media provider, other embodiments may include synchronizing advertisements of media platforms of affiliated or unaffiliated media providers.

Also, although embodiments have been described in connection with television advertisements and website banner advertisements, other embodiments may include any other type of advertisements including text, images, videos, hyperlinks, audio content, or some combination thereof. Further, although embodiments have been described in connection with television advertisements that are presented during advertising breaks in program content, other embodiments may include television advertisements that are presented during program content, such as on a portion of television screen using digital overlays.

Finally, some example embodiments may also allow administration of advertisement inventory across media platforms and logging to track usage information. Such administration may allow, for example, frequent updating of advertisements. Such logging may allow, for example, the ability to track how particular users have interacted with particular advertisements, such as selecting a website banner advertisement that takes a user to the website of the advertisement sponsor.

Although the present invention has been described in connection with specific exemplary embodiments, it should be understood that various changes, substitutions, and alterations apparent to those skilled in the art can be made to the disclosed embodiments without departing from the scope of the invention as set forth in the appended claims.

What is claimed is:

1. A method comprising:
   determining, by a current transmission engine of an advertisement synchronization device, via feedback from a first device that a user is engaged with a first media platform of a first type;
   determining, by the current transmission engine, via feedback from a second device and via a pairing process that the user is engaged with a second media platform of a second type different from the first type;
   polling, by the current transmission engine, a first media platform transmitter to determine that a first advertisement is being transmitted at a given time on the first media platform;
   selecting, by the advertisement synchronization device, a second advertisement of the second type based on business rules and weighting information to personalize the second advertisement to the user; and
   synchronizing and transmitting the second advertisement to the second media platform of the user with the first advertisement transmitted at the given time on the first media platform.

2. The method of claim 1, wherein the first media platform comprises a website and the second media platform comprises a television transmission.

3. The method of claim 2, wherein the television transmission is transmitting on-demand content at the given time.

4. The method of claim 1, wherein the first media platform comprises a television transmission and the second media platform comprises a website.

5. The method of claim 4, wherein a timing of advertising breaks on the television transmission cannot be substantially predetermined due to frequently changing timing of content on the television transmission.

6. The method of claim 1, wherein the first media platform comprises a radio transmission and the second media platform comprises a website.

7. The method of claim 1, wherein selecting the second advertisement further comprises:
   determining demographic information about the user; and
   factoring the demographic information into the selection of the synchronized second advertisement transmitted on the second media platform.

8. The method of claim 1, further comprising:
   synchronizing a third advertisement transmitted on a third media platform with the first and second advertisements transmitted on the first and second media platforms, the third media platform having a different type than the first and second media platforms.

9. A method comprising:
   determining, by a current transmission engine of an advertisement synchronization device, via feedback from one of a television or a device in communication with the television, a television transmission that a user is viewing at a given time;
   determining, by the current transmission engine, via feedback from one of a web browser or a device in communication with the web browser and via a pairing process, a website that the user is viewing at the given time;
   polling, by the current transmission engine, a first media platform transmitter to determine that a first advertisement is being transmitted at the given time on the television transmission;
   selecting, by the advertisement synchronization device, a second advertisement for the website based on business rules and weighting information to personalize the second advertisement to the user; and
   synchronizing and transmitting the second advertisement for display on the website with the first advertisement transmitted at the given time on the television transmission.

10. The method of claim 9, wherein selecting the second advertisement further comprises:
    determining demographic information about the user; and
    factoring the demographic information into the selection of the synchronized second advertisement transmitted on the website.

11. The method of claim 9, wherein the television transmission is transmitting on-demand content at the given time.

12. The method of claim 9, further comprising:
    following-up with the user regarding the first and second advertisements with a text message, an email, a telephonic communication, or some combination thereof.

13. The method of claim 9, further comprising:
    determining that the user is engaged at the given time with a third media platform having a different type than the television transmission and the website; and
    synchronizing a third advertisement transmitted on the third media platform with the first and second advertisements transmitted on the television transmission and the website.

14. The method of claim 13, wherein the third media platform comprises at least one of a radio transmission, a text message, an email, or a telephonic communication.

15. A non-transitory computer-readable medium storing instructions adapted to be executed by a processor to perform a method of cross-platform advertisement synchronization, the instructions configured to cause the processor to:
    determine, via feedback from a first device, that a user is engaged with a first media platform of a first type;
    determine, via feedback from a second device, and via a pairing process that the user is engaged with a second media platform of a second type different from the first type;
    poll a first media platform transmitter to determine that a first advertisement is being transmitted at a given time on the first media platform;
    select a second advertisement of the second type based on business rules and weighting information to personalize the second advertisement to the user; and
    synchronize and transmit the second advertisement to the second media platform of the user with the first advertisement transmitted at the given time on the first media platform.

16. The non-transitory computer-readable medium storing instructions adapted to be executed by a processor of claim 15, wherein the first media platform comprises a television transmission and the second media platform comprises a website.

17. The non-transitory computer-readable medium storing instructions adapted to be executed by a processor of claim 16, wherein a timing of advertising breaks on the television transmission cannot be substantially predetermined due to frequently changing timing of content on the television transmission.

18. The non-transitory computer-readable medium storing instructions adapted to be executed by a processor of claim 15, wherein the instructions for selecting the second advertisement cause the processor to:
    determine demographic information about the user; and
    factor the demographic information into the selection of the synchronized second advertisement transmitted on the second media platform.

* * * * *